Patented Sept. 13, 1938

2,130,016

UNITED STATES PATENT OFFICE 2,130,016

DYESTUFFS OF THE DIOXAZINE SERIES AND A PROCESS OF PREPARING THEM

Georg Kränzlein and Heinrich Greune, Frankfort-on-the-Main, and Gerhard Langbein, Hofheim-in-Taunus, Germany, assignors to General Aniline Works, Inc., New York, N. Y., a corporation of Delaware No Drawing. Application February 11, 1935, Serial No. 6,096. In Germany February 15, 1934

4 Claims. (Cl. 260—152)

This invention relates to dyestuffs of the dioxazine series, more particularly to those which contain radicals of azo-dyestuffs, and a process of preparing them.

We have found that by heating at a temperature above about 150° C. a compound of the general formula:

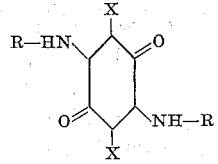

wherein R means the radical of an azo-dyestuff bound at an aromatic carbon atom and X means hydrogen, halogen or alkyl, in the presence of a solvent of high boiling point, with or without addition of an organic or inorganic oxidizing agent, a metal chloride or an acylating agent or with addition of two or more of these substances, new intensely colored products are obtainable which may be considered as dioxazine dyestuffs containing azo-groups and which correspond to the following general formula:

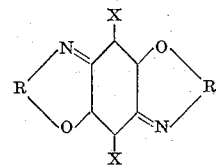

wherein R represents the radical of an azo-dyestuff bound at an aromatic carbon atom and X means hydrogen, halogen or alkyl.

In a finely dispersed state, they may be used in the usual manner as pigment dyes, for instance, for coloring caoutchouc; when sulfonated they represent valuable water-soluble dyestuffs for the vegetable, animal or artificial fiber, for instance, viscose artificial silk, or mixed fabrics. The new dyestuff-sulfonic acids are distinguished by their affinity for the vegetable fiber and their good fastness properties. In the form of their barium or calcium salt or another suitable salt they may be used as pigments.

As amino- azo-dyestuffs suitable for the invention there may be mentioned, for instance:

Amino-azo-benzene, amino-azo-naphthalene, benzene-azo-naphthylamine, benzene-azo-anthramine, benzene-azo-amino-diphenyl-amine, benzene-azo-aminocarbazole, or dyestuffs in which, for instance, naphthylamine, anthramine, amino-diphenylamine, amino-carbazole, amino-pyrene, aminochrysene or the like are combined as diazo components on aromatic amines; furthermore derivatives or substitution products of such amino-azo-dyestuffs or amino-dis- and poly-azo-dyestuffs or the sulfonic acids of all the dyestuffs mentioned.

In view of the large number of available parent materials, the shades of the final dyestuffs obtained may be varied within wide limits and their substantive character and fastness properties may be influenced.

The dioxazine dyestuffs obtainable by heating the diaryl-aminoquinones of the above general formula in a solvent of high boiling point may also be obtained in one operation from the 1.4-benzoquinones and the amino-azo-dyestuffs, by heating them above about 150° C. in solvents of high boiling point, if required with addition of organic or inorganic oxidizing agents, metal chlorides or acylating agents.

It is also possible in some cases to obtain the dioxazine-dyestuffs from the diarylaminoquinones by treating them with strong sulfuric acid or fuming sulfuric acid, advantageously in the presence of an oxidizing agent in which case the water-soluble sulfonic acids may directly be obtained. Diarylaminoquinone-derivatives containing sulfo-groups may also be transformed in this manner into the dioxazine-dyestuffs.

The following examples serve to illustrate the invention, but they are not intended to limit it thereto, the parts being by weight:

(1) 10 parts of the intermediate product obtainable by condensation of para-amino-azobenzene and toluquinone in alcohol are heated to boiling for 2 hours in 100 parts of nitrobenzene with addition of 5 parts of meta-nitrobenzenesulfochloride. The whole is filtered by suction at 130° C. and the solid matter is washed with nitrobenzene and alcohol. The dyestuff which is obtained in the form of small leaflets having a green surface luster dissolves in sulfuric acid monohydrate to a yellow-green solution and in a finely divided state forms a violet pigment.

The pigment may be sulfonated in fuming sulfuric acid of 20% strength in known manner. The sulfonic acid obtained dyes the animal, vegetable and artificial fiber (viscose artificial silk) violet tints.

(2) 10 parts of the intermediate product obtainable by condensation of 4-benzeneazo-1-naphthylamine and chloranil are heated to boiling for half an hour in 100 parts of nitrobenzene with addition of 5 parts of para-toluenesulfochloride. The whole is filtered by suction at 150° C.

and the solid matter is washed with nitrobenzene and alcohol. The dyestuff obtained forms small needles having a grey-green surface. It dissolves in sulfuric acid monohydrate to a red-brown solution. In a finely divided state it forms a blue pigment.

10 parts of the pigment are stirred for about 1 hour at about 75° C. in 200 parts of fuming sulfuric acid of 20% strength. The whole is poured on ice and sodium chloride, filtered with suction and the solid matter is washed with a solution of sodium chloride until neutral. The sulfonic acid dissolves in water to a green solution and dyes the animal and vegetable fiber and viscose artificial silk clear, green tints. The dyeings have good fastness properties. In the form of its barium or calcium salt the sulfonic acid represents valuable green pigment dyes. By effecting the sulfonation in fuming sulfuric acid of 20% strength at 45° C., a blue green sulfonic acid is obtained.

(3) 10 parts of the product obtainable by condensation of 4-amino-1.2'-azonaphthalene and dichlorobenzoquinone are heated to boiling for half an hour in 100 parts of nitrobenzene with addition of 5 parts of benzoylchloride. The whole is filtered with suction, while hot, and the solid matter is washed with nitrobenzene and alcohol. The dioxazine dyestuff which is obtained in the form of needles having a reddish surface dissolves in concentrated sulfuric acid to a grey-blue solution and yields a blue-violet pigment. By sulfonation in fuming sulfuric acid at 20% strength a sulfonic acid is obtained which dyes cotton and viscose artificial silk blue-green tints.

(4) 10 parts of the intermediate product obtainable by condensation of 4-aminoazobenzene-4'-sulfonic acid and chloranil in aqueous alcohol are stirred for about 1 hour at 150° C. in 200 parts of fuming sulfuric acid of 5% strength. After cooling, the whole is poured on ice, filtered with suction and the solid matter is washed with sodium chloride solution until neutral. In order to transform completely the sulfonic acid into the sodium salt, it is stirred for some time with dilute sodium chloride solution with addition of sodium carbonate, filtered with suction and washed again with sodium chloride solution until neutral. The dyestuff dissolves in water to a reddish-blue solution and dyes the animal and vegetable fiber and viscose artificial silk blue tints. It has good fastness properties.

We claim:

1. The members of the group consisting of compounds of the general formula:

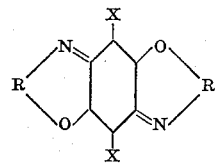

wherein R represents the radical of an azo-dyestuff and X means a member of the group consisting of hydrogen, halogen and alkyl, and sulfonic acid compounds thereof.

2. The compound of the formula:

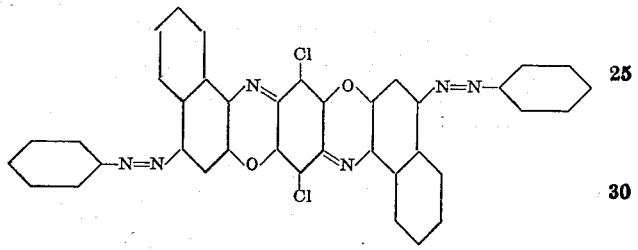

which contains sulfonic acid groups, said compound dissolving in water to a green solution and dyeing the animal and vegetable fiber and viscose artificial silk green tints.

3. The compound of the formula:

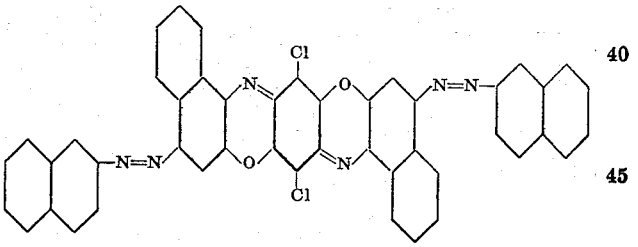

which contains sulfonic acid groups, said compound dyeing cotton blue-green tints.

4. The compound of the formula:

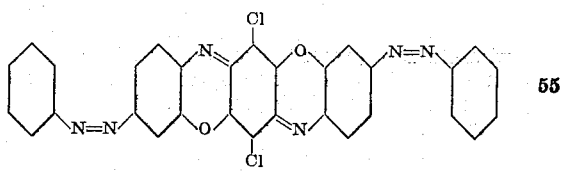

which contains sulfonic acid groups, said compound dissolving in water to a reddish-blue solution and dyeing the animal and vegetable fiber and viscose artificial silk blue tints.

GEORG KRÄNZLEIN.
HEINRICH GREUNE.
GERHARD LANGBEIN.